United States Patent Office 3,526,506
Patented Sept. 1, 1970

3,526,506
HEAT REACTIVE, LIGHT DESENSITIZING COMPOSITIONS

Wesley R. Workman, St. Paul, Minn., assignor to Minnesota Mining & Manufacturing Company, St. Paul, Minn., a corporation of Delaware No Drawing. Filed June 13, 1966, Ser. No. 556,899
Int. Cl. G03c *1/72*
U.S. Cl. 96—88 10 Claims

ABSTRACT OF THE DISCLOSURE

Heat-reactive light-desensitizable coatings and coated products containing visibly reactive co-reactants at least one of which is made non-reactive by exposure to light. Light-sensitivity is increased by incorporation of colorless aromatic sensitizer materials, e.g. anthracene.

This invention relates to the copying of graphic originals. More particularly, the invention relates to the desensitization of copy-sheet coatings which are initially capable of producing a permanent visible change on brief heating. In one aspect the invention relates to novel compositions which undergo rapid stabilization against color-producing reactivity when exposed to radiation in the near-ultraviolet. In another aspect the invention relates to copy-sheet products capable of undergoing a permanent color change on brief heating and which may be rendered stable against heat-induced color change by moderate exposure to normal room lighting.

In my earlier U.S. Pat. No. 3,094,417 there is described a heat-sensitive copy-sheet product capable of undergoing a color change when heated and of being rendered heat-stable or non-reactive by exposure to visible radiation from a tungsten filament, i.e. above about 4200 angstroms. The copy-sheet product may consist of a receptor or image sheet containing a second or co-reactant, and a photosensitive intermediate sheet containing a photosensitive first reactant and a photoreducible dye; or the several components may be incorporated in a unitary copy-sheet. In the former case the intermediate is preferably first exposed to a light-pattern to desensitize the light-struck areas and is then heated while in face-to-face contact with the image sheet to cause an image-forming reaction thereon at the less-exposed areas.

The unitary sheet may similarly be first exposed to a light-pattern and then heated to cause the color-producing reaction to occur at the less-exposed areas, or alternatively may initially be subjected to a heat-pattern to produce a colored image and then may be exposed to light to stabilize or desensitize the visibly unchanged but still heat-sensitive non-image areas.

A significant disadvantage of the unitary sheet just identified is the continuing presence of the photoreducible dye. Although present in extremely small amounts, the intense color of the these dyes produces a strong discoloration in the copy-sheet coating. As a result, the visible contrast between image and non-image areas is reduced, and the attractiveness of the copy-sheet and of the completed copy is diminished.

It has now been found possible to achieve full and rapid desensitization of photosensitive reactants and reactant compositions under exposure to low lever near-ultraviolet radiation as obtained from ordinary office lighting or the like. In accordance with the present invention, the sensitivity of the photosensitive reactant is greatly increased in the region of about 3000 to 4000 angstroms, or more particularly the region of about 3400 to 4000 angstroms, by incorporating with the said reagent a colorless or substantially colorless photosensitizer for photoautoxidation, of which an exemplary and preferred example is anthracene.

In addition to being capable of undergoing irreversible interreaction with production of a visibly distinct reaction product, the reactant materials must include at least one which is capable of being desensitized or deactivated. In most cases the exposure test described in Pat. No. 3,094,417 is adequate for determining whether or not a particular reactant has the required capability. Another test of still greater effectiveness involves decomposition with cumene hydroperoxide. The reactant to be tested is dissolved in an inert solvent such as methanol, acetone or water at minimum effective concentration. A dilute solution of cumene hydroperoxide is added and the mixture is heated sufficiently to complete any desensitization and then to destroy any excess peroxide. The residue, again in solution, is then mixed with an equal amount of the appropriate co-reactant, dried, and heated. A portion of the original solution is similarly mixed with the co-reactant, dried, and heated, to serve as a control; it produces a distinct color. Reactant materials which are capable of being desensitized and which are useful in the present invention produce very much less color, or none at all, after the peroxide treatment. In an illustrative example, one ml. of one percent solution of cumene hydroperoxide is added to nine ml. of .001 molar solution of 4-methoxy-1-naphthol, both in methanol. One ml. of the mixture is heated for one hour at 55° C. and then for one-half hour at somewhat higher temperature to remove all solvent and traces of peroxide. The residue is redissolved in 1 ml. of methanol. Three drops of the solution are placed on a piece of filter paper previously lightly uniformly coated with silver behenate and phthalazinone in 9:1 ratio. Three drops of the untreated solution of 4-methoxy-1-naphthol are similarly applied adjacent the test application, and the sheet is heated to develop a deep blue-black color at the control spot. The test spot containing the desensitized material remains a light tan color.

The test is effective also with single component reactant systems, wherein a portion of the same compound serves as the co-reactant. In this case the test and control solutions are applied to untreated paper. An example is 3-cyano - 4,5 - dimethyl-5-hydroxy-3-pyrolin-2-one, which produces a purple color when heated; whereas the test solution after treatment with cumene hydroperoxide gives a yellowish color.

Other useful reactants or reactant systems include dithiooxamide with nickel stearate, stannous sulfate with bismuth nitrate and triethanolamine, thioacetamide with nickel stearate, and the condensation product of acetone and catechol with a mixture of silver behenate and phthalazinone. In each instance the peroxide-treated mixture gives a colorless or very lightly colored spot whereas the untreated reactants produce a differently and strongly colored spot when the test sheet is heated.

Anthracene, previously mentioned, is a preferred colorless photosensitizer for photoautoxidation; others, which have been shown to have a useful sensitizing effect although to a somewhat lesser degree, include chrysene, benzophenone, 2-acetonaphthone, xanthone and 1-naphthaldehyde. The class of materials known as photosensitizers of photoautoxidation, including the compounds just named, has been identified by R. Livingston in his chapter on "Photochemical Autoxidation" appearing in the book by W. O. Lundberg, "Auto-oxidation and Antioxidations," vol. 1, 1961. Amounts of these materials sufficient to impart a significant increase in photosensitivity will ordinarily be within the range of about 2½ to about 150 parts for each 100 parts of photosensitive reactant material.

The absence of color made possible by the use of these colorless photosensitizers of course permits the manufacture of heat-sensitive copy-sheets which may be white or of any desired tint. Tinted sheets are commonly used for business correspondence and records. Starting with the formulation for a white sheet, any desired inert dye or coloring material may be added so long as the additive does not unduly affect the sensitivity of the sheet. Transparent polymeric binders such as are commonly employed in copy-sheet coatings to hold the reactant materials in heat-reactive proximity and to the paper or film backing may be included, and may be plasticized or otherwise modified as desired. Ethyl cellulose, cellulose acetate, polyvinyl acetate, polystyrene, and styrene-butadiene copolymer are particularly useful as binder materials.

An important feature of the copy-sheets of the present invention is their ability to be desensitized under exposure to radiation in the critical wavelength range between about 3400 and 4000 angstroms. Ordinary glass does not transmit below about 3400 angstroms, whereas the photosensitive reactant materials in most if not all instances do not absorb, and are not affected by, radiation above about 3400 angstroms. Even the high efficiency mercury vapor lamps, which emit a minor proportion of their total energy output at below 3400 angstroms, emit a still larger proportion at wavelengths well above 3500, specifically in the range 3600–3800 angstroms; and this portion of the radiant energy output is therefore of no utility in desensitizing copy-sheets containing only the photosensitive image-forming reactants in the absence of a further photosensitizer. Thus the invention makes possible the rapid desensitization of the heat-sensitive copy-sheet under radiation available through windows or envelopes of ordinary glass, i.e. under desk-top exposure in offices and the like, as well as increased rate of desensitization under the radiation from specialized sources.

The following examples, in which all proportions are in parts by weight unless otherwise stated, will serve further to illustrate but not to limit the invention:

EXAMPLE 1

A solution of one part of 3-cyano-4,5-dimethyl-5-hydroxy-3-pyrolin-2-one, five parts of ethyl cellulose, and 0.4 part of xanthone in 95 parts of acetone is coated on white paper, using a knife coater set at an orifice of three mils (.003 inch). The coated sheet is dried, and is a light cream color. It is exposed through a stencil for five minutes to radiation of wavelength greater than about 3000 angstroms as obtained through a Corning CS 0–54 filter from a BH–6 high pressure mercury vapor lamp at a distance of seven inches. The sheet is then heated at 130° C. for a few seconds, whereupon the unexposed areas become purple while the exposed areas remain off-white. A companion sheet prepared and treated in the same manner but containing no xanthone becomes purple over the entire heated area.

EXAMPLE 2

White paper is first coated with a composition containing 20 parts of an equimolar mixture of silver behenate and behenic acid, 10 parts of phthalazinone, six parts of styrene-isobutylene copolymer, and 164 parts of commercial heptane and which has been well mixed by grinding in a ball mill. The material is applied with a knife coater at an orifice of 3 mils and is dried.

Separate strips of the coated paper are further coated with mixtures of one part of 4-methoxy-1-naphthol, six parts of ethyl cellulose, six parts of water, 48 parts of methanol, and .05 part of a colorless photosensitizer as indicated in the following tabulation, these solutions likewise being applied from a 3-mil coating orifice and dried. The resulting substantially white copy-sheets are each briefly subjected to a heat-pattern in a thermographic copying machine, producing a blue-black image at the heated pattern areas. The sheets are then placed on a desk top for six hours under ordinary office illumination obtained from fluorescent lighting, and tested for residual heat-sensitivity by again being subjected to a heat-pattern in the copying-machine. Other portions of the sheets are exposed for five minutes to radiation above 3400 angstroms, and still others at above 3000 angstroms, the radiation being obtained from a BH–6 lamp at seven inches and fitted with appropriate filters to remove the radiation of lower wavelength. These portions are then heated at 130° C. for four seconds and the relative reflection optical densities of the exposed and heated areas are measured.

| Sample | Sensitizer | 6-hour fluorescent | Density after exposure at— | |
|---|---|---|---|---|
| | | | >3,000 | >3,400 |
| 1 | None | No effect | .52 | 1.25 |
| 2 | Anthracene | Deactivated | .40 | .48 |
| 3 | Chrysene | Partly deactivated | .39 | .95 |
| 4 | 1-naphthaldehyde | do | .44 | 1.00 |
| 5 | 2-aceto-naphthone | do | .42 | 1.10 |
| 6 | Xanthone | do | .38 | 1.00 |

It will be seen that the copy-sheet containing anthracene is completely desensitized after only six hours of normal office exposure, those containing the other additives being partially deactivated. On the contrary, the control sheet, on being heated after the six-hour exposure, is found to produce fully as complete a color change as had been obtained prior to exposure. Similarly, with radiation of wavelengths down to 3000 angstroms, image density obtained without additive is seen to be significantly greater than that obtained in the presence of the sensitizer; and the same is true with radiation above 3400 angstroms, where the effect of anthracene as sensitizer is particularly apparent.

EXAMPLE 3

A solution containing a .2 part of 4-methoxy-1-naphthol, 10 parts of ethyl cellulose and .3 part of anthracene in 180 parts of acetone and 10 parts of n-butanol is coated at an orifice of 3 mils on transparent polyester film and dried to produce a photosensitive intermediate sheet. A control sheet is similarly prepared but omitting the anthracene. An image or receptor sheet is separately prepared by coating on white paper a ballmilled mixture of 10 parts of zinc oxide, 2.5 parts of silver behenate, one part of phthalazinone toner, three parts of polyterpene resin, 0.05 part of tetrachlorophthalic anhydride, 1.5 parts of polyvinyl acetate, 2.5 parts of cellulose acetate, and 80 parts of acetone, followed by drying.

The intermediate films are exposed through a photographic step wedge to radiation at wavelengths greater than 3000 angstroms, obtained through a Corning CS 0–54 filter from a BH–6 lamp at 7 inches for five minutes. The films are then placed in contact with the image sheet and heated for four seconds at 130° C. The reflection optical density of the areas corresponding to the several steps of the step wedge is measured.

| Step No. | 1 | 2 | 3 | 4 | [1] 5 |
|---|---|---|---|---|---|
| Control density | .06 | .20 | .37 | .92 | ------- |
| Test sample density | .06 | .06 | .06 | .06 | .11 |

[1] Darkest.

The test shows that the test sample is almost completely desensitized or stabilized under the darkest step, i.e. under exposure conditions which produce almost no stabilization of the control sample.

In a similar test but using a Corning CS 3–73 filter which removes all wavelengths below 4000 angstroms, neither sample showed any loss of sensitivity. The test shows that the reactant is photosensitive in the range 3000 to 4000 angstroms, and that the exposure required to deactivate the reactant is reduced at least to about one-fourth the initial requirements by the incorporation of a photoautoxidation photosensitizer such as anthracene.

Again, under exposure to radiation within the more restricted range of 3400 to 4000 angstroms, as obtained from the BH–6 lamp using a CS 0–52 filter, the addition of one-half its weight of anthracene is found to give a 17-fold increase in the photosensitivity of 4-methoxy-1-naphthol.

An analogous reduction in exposure requirements is attained using an intermediate containing dithiooamide and ethyl cellulose in conjunction with an image sheet coated with nickel stearate, silica flour and polyvinyl acetate. The addition of an amount of anthracene equal to that of the dithiooxamide again greatly increases the speed of photodesensitization of the photosensitive reactant. The same is true also with thioacetamide as the photosensitive reactant. In this case only one part of anthracene is required for 40 parts of reactant.

What is claimed is as follows:

1. Sheet material including a photosensitive stratum comprising: a photosensitive first reactant material which is reactive in a chemical inter-reaction with a co-reactant material when heated for about four seconds at about 130° C. in contact therewith to produce a visibly distinct reaction product and which first reactant material is readily desensitized against said inter-reaction on being heated with cumene hydroperoxide in dilute solution in an inert solvent; and a substantially colorless polyatomic aromatic photoautoxidation photosensitizer.

2. Sheet material according to claim 1 wherein the photoautoxidation photosensitizer is present in an amount of from about 2½ to about 150 parts based on 100 parts of said first reactant and sufficient to impart a significant increase in photosensitivity to said stratum in the wavelength range of 3000 to 4000 angstroms.

3. Sheet material according to claim 2 wherein the photoautoxidation photosensitizer is anthracene.

4. Sheet material according to claim 1 and including said co-reactant material in heat-reactive juxtaposition with said first reactant material.

5. Sheet material according to claim 4 wherein said co-reactant material and said first rectant material are in separate surface layers on separate thin flexible backings.

6. Sheet material according to claim 4 wherein said co-reactant material and said first reactant material are in heat-reactive juxtaposition in a surface layer on a thin flexible backing.

7. Sheet material according to claim 1 and which is useful as a heat-sensitive copy-sheet capable of being rapidly desensitized and rendered stable against heatimaging by exposure to radiation within the range of 3400 to 4000 angstroms; said sheet material including a photosensitive stratum comprising first and second reactant material, substantially colorless polyatomic aromatic photoautoxidation photosensitizer material in an amount of from about 2½ to about 150 parts per 100 parts of said first reactant material, and transparent polymeric binder; said binder maintaining said first and second reactant material in heat-reactive juxtaposition; and said first reactant material being photosensitive, inter-reactive with said second reactive material with formation of a visibly distinct reaction product on heating said copy-sheet to about 130° C. for about four seconds, and capable of being rendered non-reactive with said second reactant material on being heated with cumene hydroperoxide in dilute solution in an inert solvent.

8. Sheet material according to claim 7 wherein the colorless photoautoxidation photosensitizer material is anthracene.

9. An article having a surface, and a thin heat-sensitive light-desenitizable coating thereon comprising: a photosensitive first reactant and a co-reactant which is visibly inter-reactive with said first reactant on heating said coating for about four seconds at about 130° C., said first reactant being capable of being readily rendered non-inter-reactive with said co-reactant by heating with cumene hydroperoxide in dilute solution in an inert solvent; and from about 2½ to about 150 parts, per 100 parts of said first reactant, of anthracene, chrysene, benzophenone, 2-acetonaphthone, xanthone or 1-naphthaldehyde as a photosensitizer.

10. The article of claim 9 wherein said coating includes a polymeric binder and wherein the photosensitizer is anthracene.

References Cited

UNITED STATES PATENTS

| | | | |
|---|---|---|---|
| 3,094,417 | 6/1963 | Workman | 96—90 X |
| 3,155,513 | 11/1964 | Sorensen | 96—91 |

NORMAN G. TORCHIN, Primary Examiner

R. E. FICHTER, Assistant Examiner

U.S. Cl. X.R.

96—76, 90, 114.1; 117—36.2, 36.9